United States Patent
Franken et al.

(10) Patent No.: US 12,448,547 B2
(45) Date of Patent: Oct. 21, 2025

(54) HEAT SEPARABLE TWO-LAYER ADHESIVE SYSTEM AND PROCESS OF ADHESIVE DEBONDING USING THE SAME

(71) Applicant: Henkel AG & Co. KGaA, Duesseldorf (DE)

(72) Inventors: Uwe Franken, Dormagen (DE); Hans-Georg Kinzelmann, Pulheim (DE); Andreas Ferencz, Duesseldorf (DE); Stefanie Stapf, Essen (DE)

(73) Assignee: Henkel AG & Co. KGaA, Duesseldorf (DE)

(*) Notice: Subject to any disclaimer, the term of this patent is extended or adjusted under 35 U.S.C. 154(b) by 233 days.

(21) Appl. No.: 17/938,802

(22) Filed: Oct. 7, 2022

(65) Prior Publication Data

US 2023/0039626 A1   Feb. 9, 2023

Related U.S. Application Data

(63) Continuation of application No. PCT/EP2021/059258, filed on Apr. 9, 2021.

(51) Int. Cl.
   *C09J 7/40*     (2018.01)
   *C09J 5/06*     (2006.01)
   *C09J 11/04*    (2006.01)
   *C09J 201/00*   (2006.01)

(52) U.S. Cl.
   CPC ............. *C09J 7/401* (2018.01); *C09J 5/06* (2013.01); *C09J 11/04* (2013.01); *C09J 201/00* (2013.01); *C09J 2203/37* (2020.08); *C09J 2301/314* (2020.08); *C09J 2301/408* (2020.08); *C09J 2301/502* (2020.08)

(58) Field of Classification Search
   CPC ................. C09J 7/401; C09J 201/00
   See application file for complete search history.

(56) References Cited

U.S. PATENT DOCUMENTS

| | | | |
|---|---|---|---|
| 4,171,240 A | 10/1979 | Wong | |
| 4,729,797 A | 3/1988 | Linde et al. | |
| 5,100,494 A | 3/1992 | Schmidt | |
| 5,620,794 A * | 4/1997 | Burkart | E06B 3/56 52/99 |
| 7,407,704 B2 | 8/2008 | Kirsten | |
| 10,590,310 B2 | 3/2020 | Heucher et al. | |

(Continued)

FOREIGN PATENT DOCUMENTS

| | | |
|---|---|---|
| CN | 108602313 A | 9/2018 |
| DE | 102012203794 A1 | 9/2013 |

(Continued)

OTHER PUBLICATIONS

Machine translation JP2001202821A (Year: 2001).*

(Continued)

*Primary Examiner* — Abbas Rashid
*Assistant Examiner* — Ayne K. Swier
(74) *Attorney, Agent, or Firm* — Sun Hee Lehmann

(57) ABSTRACT

The present invention relates to a heat separable two-layer adhesive system, to a process of adhesive debonding using the adhesive system and to a heat separable bonded composite body. In particular, the present invention relates to a heat separable two-layer adhesive system comprising an adhesive layer having conductive particles.

19 Claims, 1 Drawing Sheet

(56) References Cited

U.S. PATENT DOCUMENTS

| | | |
|---|---|---|
| 10,800,956 B2 | 10/2020 | Heucher et al. |
| 11,964,462 B2 | 4/2024 | Akamatsu et al. |
| 2003/0102466 A1 | 6/2003 | Kumakura et al. |
| 2005/0039848 A1* | 2/2005 | Kirsten .............. C09J 9/00 |
| | | 252/62.51 R |
| 2010/0021668 A1 | 1/2010 | Shimokawa et al. |
| 2014/0291869 A1 | 10/2014 | Park et al. |
| 2014/0374032 A1 | 12/2014 | Heucher et al. |
| 2015/0000838 A1 | 1/2015 | Khachatryan |
| 2018/0022968 A1 | 1/2018 | Yoshizawa et al. |
| 2019/0233691 A1* | 8/2019 | Dörr ................ C08G 18/4808 |
| 2019/0367783 A1 | 12/2019 | Shirakawa et al. |

FOREIGN PATENT DOCUMENTS

| | | | | |
|---|---|---|---|---|
| EP | 3262132 | A1 | 1/2018 | |
| EP | 3363873 | A1 | 8/2018 | |
| GB | 1204843 | A | 9/1970 | |
| JP | H05201246 | A | 8/1993 | |
| JP | 2001202821 | A * | 7/2001 | |
| JP | 2008144116 | A | 6/2008 | |
| JP | 2015229699 | A | 12/2015 | |
| JP | 2019156914 | A | 9/2019 | |
| WO | 2014113937 | A1 | 7/2014 | |
| WO | WO-2015064440 | A1 * | 5/2015 | ............... B08B 1/10 |
| WO | 2016202651 | A1 | 12/2016 | |
| WO | WO-2019123739 | A1 * | 6/2019 | ............... C09J 7/38 |
| WO | 2020009792 | A1 | 1/2020 | |

OTHER PUBLICATIONS

OSHA Occupational Chemical Database—Diethylene Glycol Monobutyl Ether (Butyl Carbitol). https://www.osha.gov/chemicaldata/812 (Year: 2024).*
Machine translation JPH05201246A (Year: 1993).*
Machine translation WO2015064440A1 (Year: 2015).*
Machine translation WO2019123739A1 (Year: 2019).*
International Search Report for International PCT Patent Application No. PCT/EP2021/059258, Mailing date Jun. 9, 2021.

* cited by examiner

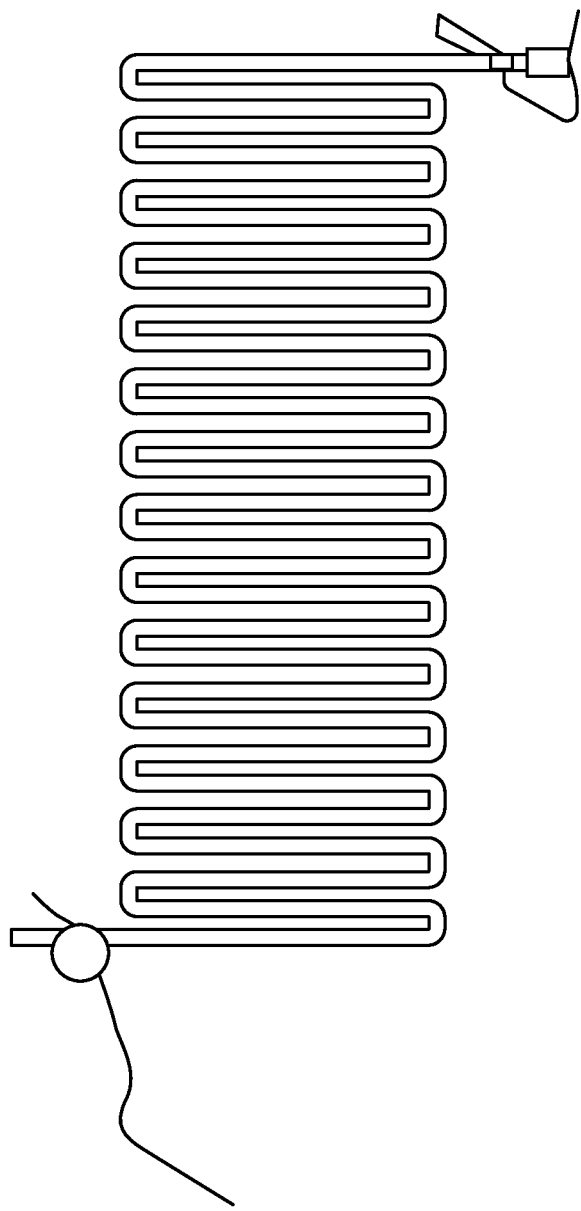

HEAT SEPARABLE TWO-LAYER ADHESIVE SYSTEM AND PROCESS OF ADHESIVE DEBONDING USING THE SAME

The present invention relates to a heat separable two-layer adhesive system, to a process of adhesive debonding using the adhesive system and to a heat separable bonded composite body. In particular, the present invention relates to a heat separable two-layer adhesive system comprising an adhesive layer having conductive particles.

Adhesive bonds are commonly used in the assembly and finishing of manufactured goods. They are used in place of mechanical fasteners, such as screws, bolts and rivets, to provide bonds with reduced machining costs and greater adaptability in the manufacturing process. Adhesive bonds distribute stresses evenly, reduce the possibility of fatigue, and seal the joints from corrosive species.

The ability to easily separate an adhesive bond, however, provides many benefits. Debonding, i.e., the release of an adhesive bond, may be desired when there is a need to disassemble a temporary structure or a previously bonded assembly of items, e.g., to allow repair, refurbishment, replacement or renovation operations. Simplified disbonding procedures also facilitate end-of-life recycling of materials and components from adhesively bonded goods and structures. Moreover, reversible bonding is beneficial for packaging or for use in securing items during shipping.

The separation strategies that do exist typically involve time-consuming chemical procedures requiring high temperatures and aggressive chemicals. Examples of such techniques are described in U.S. Pat. No. 4,171,240 to Wong, U.S. Pat. No. 7,407,704 to Kirsten and U.S. Pat. No. 4,729,797 to Linde et al. These techniques, although generally effective, are quite harsh and can damage the objects being separated, making them unsuitable for many applications.

To provide materials that are more easily removed from a substrate, the prior art describes adhesives formed from reactive monomers containing linkages susceptible to chemical degradation, e.g., curable resins containing thermally labile linkages or thermally reversible crosslinks. Although these specially prepared materials are more readily cleaved from the substrate, they still require conditions that are harsh to delicate substrates or adjacent adhesive bonds.

Adhesives that are electrically debondable and contain ionic components are known as well as various ionic liquids that can generate conductivity in solids. For example, DE 102012 203 794 A1 describes a hot melt adhesive based on polyamides that contains ionic electrically conductive components that is debondable upon application of an electric voltage. EP 3262132 A1 discloses a reactive hot melt adhesive composition comprising an isocyanate-functional polyurethane polymer and an organic or inorganic salt, which at least partially loses its adhesiveness upon application of an electric voltage and thus allows debonding of substrates that have been bonded using said adhesive.

Thus, there still remains the need in the art for improved adhesive systems, in particular adhesive systems that can be used for debonding various adhesives, such as polyurethanes, epoxies and acrylates, and can be debonded selectively and precisely under mild conditions. Such an adhesive system would provide adhesive bonds that could be employed in a variety of applications where facile removal of the adhesive is desired and additionally provide all the advantages of an adhesive.

The inventors have now surprisingly found that this need can be met by a heat separable two-layer adhesive system that contains a layer of adhesive having conductive particles. This is even more surprising, since the adhesive system is heat separable by applying a relatively low electrical power to heat.

In one aspect, the present invention relates a heat separable two-layer adhesive system, comprising a layer of first adhesive and a layer of second adhesive bonded to the layer of a first adhesive, wherein the layer of first adhesive comprises conductive particles selected from the group consisting of silver, gold, palladium, platinum, carbon black, carbon fiber, graphite, indium tin oxide, silver-plated nickel, silver-plated copper, silver-plated graphite, silver-plated aluminum, silver-plated fiber, silver-plated glass, silver-plated polymer, antimony-doped tin oxide and combination thereof.

In another aspect, the present invention relates to a process for adhesive separation, comprising providing a heat separable two-layer adhesive system according to the present invention, and subjecting the layer of first adhesive to a resistive heating, wherein the layer of first adhesive is locally heated, whereby said adhesive system is separable.

In yet another aspect, the present invention relates to a heat separable bonded composite body, comprising a first substrate, a heat separable two-layer adhesive system according to the present invention, and a second substrate.

FIG. 1 shows the continuous-wave shape polycarbonate substrate having a layer of conductive adhesive used for testing the debonding performance in the present invention.

Further preferred embodiments of the invention are set out in the claims.

In the present specification, the terms "a" and "an" and "at least one" are the same as the term "one or more" and can be employed interchangeably.

"One or more", as used herein, relates to at least one and comprises 1, 2, 3, 4, 5, 6, 7, 8, 9 or more of the referenced species. Similarly, "at least one" means one or more, i.e. 1, 2, 3, 4, 5, 6, 7, 8, 9 or more. "At least one", as used herein in relation to any component, refers to the number of chemically different molecules, i.e. to the number of different types of the referenced species, but not to the total number of molecules.

If reference is made herein to a molecular weight of a polymer or its components, this reference refers to the average number molecular weight Mn, if not explicitly stated otherwise. The number average molecular weight Mn can be calculated based on end group or can be determined by gel permeation chromatography with THF as the eluent. If not stated otherwise, all given molecular weights are those determined by end group analysis. The weight average molecular weight Mw can be determined by GPC, as described for Mn.

All percentages given herein in relation to the compositions or formulations relate to weight % relative to the total weight of the respective composition or formula, if not explicitly stated otherwise.

According to the present invention, the heat separable two-layer adhesive system comprises a layer of first adhesive and a layer of second adhesive bonded to the layer of a first adhesive, wherein the layer of first adhesive comprises conductive particles selected from the group consisting of silver, gold, palladium, platinum, carbon black, carbon fiber, graphite, indium tin oxide, silver-plated nickel, silver-plated copper, silver-plated graphite, silver-plated aluminum, silver-plated fiber, silver-plated glass, silver-plated polymer, antimony-doped tin oxide and combination thereof.

When a low voltage such as 1 to 40 V is applied to the first adhesive layer, the conductive particles are heated so as to loosen the interface of the first and second adhesive layers, rendering the adhesive system easily separable.

In one preferred embodiment, the conductive particles in the layer of the first adhesive are selected from the group consisting of silver, silver-plated nickel, silver-plated copper, silver-plated graphite, silver-plated aluminum, silver-plated fiber, silver-plated glass, silver-plated polymer, and combination thereof. The conductive particles of the first adhesive layer may have any shape. For example, the particles may be cubic, substantially spherical, or oval or flaky. The particle surface may be smooth, rough or angled and the particles may be polyhedral or have a single continuously curved surface. The particles may be porous or non-porous. In one more preferred embodiment, the conductive particles are flaky silver (silver flakes).

In the present invention, the first adhesive is the cured product of an adhesive composition comprising a resin binder and the conductive particles. Solvent is added in the preparation of the composition as needed to reach a usable viscosity for mixing and dispensing. Solvent is not included in the weight percentages of components for the adhesive compositions.

Suitable binder resins for the first adhesive are thermoplastic resins, chosen to reach desired conductivity and flexibility and adequate impact or scratch resistance for the targeted end use. Suitable thermoplastic polymers include, but are not limited to, polyesters, phenoxy resins, phenolic resins, acrylic polymers, acrylic block copolymers, acrylic polymers having tertiary-alkyl amide functionality, polysiloxane polymers, polystyrene copolymers, polyvinyl polymers, divinylbenzene copolymers, polyetheramides, polyvinyl acetals, polyvinyl butyrals, polyvinyl acetols, polyvinyl alcohols, polyvinyl acetates, polyvinyl chlorides, methylene polyvinyl ethers, cellulose acetates, styrene acrylonitriles, amorphous polyolefins, thermoplastic urethanes, polyacrylonitriles, ethylene vinyl acetate copolymers, ethylene vinyl acetate terpolymers, functional ethylene vinyl acetates, ethylene acrylate copolymers, ethylene acrylate terpolymers, ethylene butadiene copolymers and/or block copolymers, styrene butadiene block copolymers.

Suitable commercially available binder resins include those sold under the product designations ESTANE 5715P, which is a thermoplastic polyurethane available from The Lubrizol Corporation, Cleveland, Ohio, USA; those sold under the product designation VITEL 220B, which is polyester type thermoplastic from Bostik Findley, Inc; and those sold under the product designations PKHB, PKHC, PKHH, PKHJ, and PKFE, which are phenoxy resins available from Inchem, South Carolina, USA.

The total resin binder content is in the range of 1 to 60 weight percent of the total dry composition; in another embodiment the total resin binder content is in the range of 5 to 30 weight percent of the total dry composition.

In one embodiment, the conductive particles have a surface area of from 0.01 $m^2$/g to 10 $m^2$/g, and preferably from 0.05 $m^2$/g to 5 $m^2$/g, measured by Brunauer-Emmett-Teller (BET) method to improve the flexibility of the adhesive layer. The conductive particles are not restricted to bulk metallic or conductive particles (that is, those without a core), but include even metallic-plated core particles. The conductive particles will be present in the range of 40 to 99 weight percent of the total dry composition and preferably in the range of 70 to 95 weight percent of the total dry composition. The average particle size of the conductive particles is preferably in the range of 1 to 100 μm, more preferably in the range of 5 to 20 μm.

As needed to enable efficient dispensing, the viscosity of the adhesive composition can be adjusted with solvents. Viscosities within the range of 50 to 150,000 mPa s are suitable for many means of dispensing. For rotogravure or flexo printing, a suitable viscosity is within the range of 500 to 4,000 mPa s; for stencil or screen printing, a suitable viscosity is within the range of 4,000 to 50,000 mPa s. The total amount of solvent is not critical but is adjusted to obtain a useful viscosity.

Exemplary solvents, which may be utilized either separately or in combination, include 1,4-butanediol diglycidyl ether, p-tert-butyl-phenyl glycidyl ether, allyl glycidyl ether, glycerol diglycidyl ether, butyldiglycol, 2-(2-butoxyethoxy)-ethylester, butylglycolacetate, acetic acid, 2-butoxyethylester, butylglycol, 2-butoxyethanol, isophorone, 3,3,5 trimethyl-2-cyclohexene-1-one, dimethylsuccinate, dimethylglutarate, dimethyladipate, acetic acid, dipropylene glycol (mono)methyl ether, propylacetate, glycidyl ether of alkyl phenol (commercially available from Cardolite Corporation as Cardolite NC513), and refined dimethyl esters of adipic, glutaric, and succinic acids (commercially available as DPE Dibasic Esters from Invista).

Preferred solvents are those with a flash point above 70° C., and include the following, where b.p. is the boiling point and f.p. is the flash point: butyl glycol acetate (b.p. 192.3° C., f.p. 87° C.), carbitol acetate (b.p. 217.4° C., f.p. 109° C.), glycol ether (DOWANOL DPM, b.p.190° C., f.p. 75° C.), dibasic esters, such as, the dimethyl esters of adipic, glutaric, and succinic acids (DPE, b.p.196-225° C., f.p. 94° C.), dibasic ester (DBE-9, b.p. 196-215° C., f.p. 94° C.), and ethyl glycol (CARBITOL, b.p. 201.9° C., f.p. 83° C.).

Additional organic additives may be included in the composition for the first adhesive to provide desired properties. Various additives typically used include catalysts, surface active agents, surfactants, wetting agents, antioxidants, thixotropes, reinforcement fibers, silane functional perfluoroether, phosphate functional perfluoroether, titanates, wax, phenol formaldehyde, air release agents, flow additives, adhesion promoters, and rheology modifiers. The additional ingredients are optional and are specifically chosen to obtain any desired properties for the chosen end use. When used, the additives can comprise up to about 10 weight percent of the total dry composition.

According to the present invention, the second adhesive is cured product of an adhesive composition comprising a resin binder. There is no limitation to the selection of the resin binder. The inventors have surprisingly found that the inventive heat separable adhesive system is suitable for debonding a wide variety of adhesives including thermoplastic resin adhesives and thermoset resin adhesive.

In one embodiment, the resin binder for the second adhesive is a thermoplastic resin. A wide variety of known thermoplastic resins can be used in the present invention. The thermoplastic resin may be any thermoplastic resin, preferably a block copolymer. Exemplary suitable thermoplastic resins to be used here in the present invention include phenoxy resins, polyesters, thermoplastic urethanes, phenolic resins, acrylic polymers, acrylic block copolymers, acrylic polymers having tertiary-alkyl amide functionality, polysiloxane polymers, polystyrene copolymers, polyvinyl polymers, divinylbenzene copolymers, polyetheramides, polyvinyl acetals, polyvinyl butyrals, polyvinyl acetols, polyvinyl alcohols, polyvinyl acetates, polyvinyl chlorides, methylene polyvinyl ethers, cellulose acetates, styrene acrylonitriles, amorphous polyolefins, polyacrylonitriles, ethylene vinyl acetate copolymers, ethylene vinyl acetate terpolymers, functional ethylene vinyl acetates, ethylene acrylate copolymers, ethylene acrylate terpolymers, ethylene butadiene copolymers and/or block copolymers, styrene butadiene block copolymers, or combination thereof.

According to the present invention, if the layer of second adhesive comprises a thermoplastic resin. The said adhesive layer has a boundary layer in contact with the layer of first adhesive, and the boundary layer is heated by the layer of first adhesive to above the softening point of the thermoplastic resin, which makes the adhesive layers loosen and separable.

In another embodiment, the resin binder for the second adhesive is a thermoset resin. A wide variety of known thermoset resins can be used in the present invention. Exemplary suitable thermoset resins to be used herein the present invention include vinyl resins, acrylic resins, phenolic resins, epoxy resins, maleimide resins, bismaleimide resins, polyimide resins, and silicon-containing resins and mixtures thereof. Preferably said thermoset resin is selected from epoxy resin and acrylate resin and mixtures thereof.

Suitable thermoset resins to be used herein the present invention have a molecular weight Mw greater than 10,000.

If the layer of second adhesive comprises a thermoset resin. The adhesive layer has a boundary layer in contact with the layer of first adhesive, and the boundary layer is heated by the layer of first adhesive to a temperature that breaks the cross-linked thermoset structure, which makes the adhesive layers loosen and separable.

The composition of the second adhesive may also comprise conductive particles as used in the composition of the first adhesive according to end use. In one preferred embodiment, the composition of the second adhesive comprises no conductive particles. In another preferred embodiment, the composition of the second adhesive comprises conductive particle such as carbon black for improving the adhesion performance of the second adhesive.

Additional organic additives may be included in the composition of the second adhesive to provide desired properties. Various additives typically used include solvents, catalysts, surface active agents, surfactants, wetting agents, antioxidants, thixotropes, reinforcement fibers, silane functional perfluoroether, phosphate functional perfluoroether, titanates, wax, phenol formaldehyde, air release agents, flow additives, adhesion promoters, and rheology modifiers. The additional ingredients are optional and are specifically chosen to obtain any desired properties for the chosen end use. When used, the additives can comprise up to about 30 weight percent of the total dry composition.

Another aspect of the present invention is directed to a heat separable bonded composite body, comprising a first substrate, a heat separable two-layer adhesive system as described above, and a second substrate. The heat separable bonded composite body may further comprise one or more substrates and one or more adhesives. In a preferred embodiment, the heat separable bonded composite body is in the form of laminate. In another preferred embodiment, the first and second substrates are bonded by the heat separable two-layer adhesive system.

There is no limitation to the thickness of the two adhesive layers used in the composite body. The first adhesive layer may have a thickness of from 1 μm to 10 mm and in particular from 10 μm to 1 mm. The second adhesive layer may have a thickness of from 1 μm to 10 mm and in particular from 10 μm to 1 mm. In one embodiment, the first adhesive layer is thinner than the second adhesive layer.

There is no limitation to the substrate used in the present invention. Examples of the substrates suitable for used as the first or second substrates are wood, paper, cardboard, plastics such as polyvinyl chloride (PVC), polypropylene (PP), polystyrene (PS), acrylonitrile-butadiene-styrene copolymers (ABS), Polyesters or polyamides, organic polymers such as cellophane, polyolefins such as polyethylene (LDPE, LLDPE, metallocene-catalyzed PE, HDPE) or polypropylene (PP, CPP, OPP); Polyvinyl chloride (PVC); Ethylene copolymers, such as ethylene vinyl acetate (EVA), ethylene acrylate copolymers (EMA), EMMA, EAA; polyesters; PLA, polyamide or ionomers, such as ethylene/acrylic acid copolymers glass, concrete, ceramics, and stone.

The heat separable bonded composite body may comprise one or more adhesive layers other than the first and second adhesive layers, and/or one or more substrates other than the first and second substrates as long as the intention to debonding the composite body can be achieved.

The heat separable bonded composite body according to the present invention can be widely used in electronic devices, integrated circuits, semiconductor devices, solar cells and/or solar battery modules and other devices, including energy production, personal computers, control systems, telephone networks, automotive electronics, devices, displays, semiconductor packages, passive components, and handheld devices.

Yet another aspect of the present invention concerns a process for adhesive separation, comprising providing a heat separable two-layer adhesive system as described above, and subjecting the layer of first adhesive to resistive heating, wherein the layer of first adhesive is locally heated, whereby said adhesive system is separable. The two-layer adhesive system is heat separable under a temperature from 60° C. to 110° C., preferably from 60 to 90° C., and more preferably from 60 to 75° C.

This heating of the layer of the first adhesive is used to separate the adhesive system or the composite body. The conductive particles are used as fillers with "signal receiving" properties so that the energy generated from the resistive heating is targeted for introduction into the layer of the first adhesive. As a result of the energy input to the layer, there is a localized large increase in temperature, which facilitates loosening of the adhesive system or the composite body. In the case of non-reactive, thermoplastic adhesive used as the second adhesive, this energy input to the first adhesive causes melting of the adjoining adhesive polymer, in the case of reactive, i.e. cross-linked thermoset adhesive used as the second adhesive, the rise in temperature leads to thermal degradation of the boundary layer of the polymer and thus to a break in the adhesive joint. In this context, particularly preferred adhesives are those which are either thermally labile themselves or in which the polymer backbone contains a few thermally labile groups. Modification of adhesives with thermally labile additives which can be activated as a result of a rise in temperature and thus can initiate failure of adhesion can also be successfully used for the heat separable adhesive system or composite body according to the invention.

Compared with traditional methods of warming, the process according to the invention is characterized in that heat production is locally defined in the boundary layer between the heated adhesive layer and the adjacent adhesive layer in the adhesive system and that thermal stress to the bonded substrate materials and the second adhesive matrix itself is avoided or minimized. The process is time-saving and effective because the heat does not have to be introduced into the adhesive system by a diffusion process through the bonded substrates. This process also reduces to a considerable extent the heat losses due to dissipation of heat or radiation of heat via the substrate or the second adhesive matrix, which makes the process according to the invention especially economical. As a result of the locally defined increase in temperature within the first adhesive layer the second adhesive is selectively destroyed only at the first adhesive/second adhesive interface, which facilitates "quasi-adhesive" separation of the substrates.

Compared with traditional methods of heating with the aid of alternating electric, magnetic or electromagnetic fields, the requirement and cost for the heating equipment in the present invention is much more decreased as only lower power equipment for resistive heating such as Lithium batteries is provided, and the adhesive system is resistive heat separable.

In one embodiment, the power of the resistive heating applied on the first adhesive layer is no larger than 40 Watt, and preferably no larger than 30 Watt. Preferably, the applied voltage of the resistive heating is no larger than 30 V, preferably no larger than 20 V, and more preferably no larger than 15 V.

The present disclosure may be further understood with reference to the following examples. These examples are intended to be representative of specific embodiments of the disclosure and are not intended to be limiting to the scope of the disclosure.

EXAMPLE

Preparation of the Conductive Adhesive Compositions
Conductive Adhesive Composition 1 (CAC-1)

The adhesive composition was prepared by mechanically mixing 1.78 g commercial polyurethane resin, 11.11 g silver flake having a surface area of 0.7 to 1.35 m²/g, 5.37 g diethylene glycol monobutyl ether and 1.74 g dipropylene glycol methyl ether to form a uniform paste.
Conductive Adhesive Composition 2 (CAC-2)

The adhesive composition was prepared by mechanically mixing 1.78 g commercial polyurethane resin, 11.11 g silver flake having a surface area of 1.2 m²/g, 5.37 g diethylene glycol monobutyl ether and 1.74 g dipropylene glycol methyl ether to form a uniform paste.
Conductive Adhesive Composition 3 (CAC-3)

The adhesive composition was prepared by mechanically mixing 0.43 g commercial bisphenol F epichlorohydrin resin, 0.03 g phenol formaldehyde resin, 18.27 g silver flakes having a surface area of 0.71 m²/g, 0.95 g diethylene glycol monoethyl ether and 0.28 g hexahydrophthalic acid diglycidyl ester to form a uniform paste.
Conductive Adhesive Composition 4 (CAC-4)

The adhesive composition was prepared by mechanically mixing 0.33 g commercial bisphenol F epichlorohydrin resin, 0.55 g phenol formaldehyde resin, 8.19 g silver flakes having a surface area of 0.71 m²/g, 0.03 g polypropylene carbonate and 0.87 g carbitol acetate to form a uniform paste.
Preparation of Heat Separable Composite Body The conductive adhesive compositions were applied on a continuous-wave shape polycarbonate substrate by a dispensing robot system Loctite RB40 400 manufactured by Henkel. The needle distance to the object is 0.5 mm. The application pressure is 1.6 bar. The application temperature is 26° C. The applied conductive adhesive composition was cured for 1.5 to 2 h at 120° C.

As shown in FIG. 1, the continuous-wave shape polycarbonate substrate includes 28 loops and 29 lines. Each line of the substrate has a thickness of 0.45 mm, a length of 30 mm and a gap of 2.5 mm. The thickness of the cured conductive adhesive layer on the substrate is 0.37 to 0.4 mm and the cured area is 30 mm×86 mm. The resistance length is 95.4 cm.

Afterwards, a second adhesive was applied on top of the conductive adhesive layer and a polyester substrate having a thickness of about 100 μm was superposed on the commercial adhesives. The substrates were briefly pressed on by hand. The second adhesive was cured to reach a thickness of 100 μm.

Example 1

According to the above preparation method, CAC-1 was used as the conductive adhesive composition. A commercial two-component polyurethane adhesive composition was used as the second adhesive composition and cured as an adhesive layer having a thickness of 50 μm to obtain a composite body.

Example 2

According to the above preparation method, CAC-2 was used as the conductive adhesive composition. A commercial one-component epoxy adhesive composition was used as the second adhesive composition and cured as an adhesive layer having a thickness of 50 μm to obtain a composite body.

Example 3

According to the above preparation method, CAC-2 was used as the conductive adhesive composition. A commercial acrylate-based pressure sensitive adhesive composition was used as the second adhesive composition and cured as an adhesive layer having a thickness of 30 μm to obtain a composite body.

Example 4

According to the above preparation method, CAC-2 was used as the conductive adhesive composition. A commercial acrylate-based pressure sensitive adhesive composition was used as the second adhesive composition and cured as an adhesive layer having a thickness of 60 μm to obtain a composite body.
Testing Method of Debonding Performance After the conductive adhesive layer was cured on the continuous-wave shape substrate, two wires of a direct current electricity generator were connected to the two ends of the substrate having the conductive adhesive layer. Voltages were applied on the conductive adhesive layer for 20 seconds until the average temperature of the adhesive layer on lines 3, 14 and 25 measured by a non-contact temperature gun achieved 60 to 70° C. The test results are shown in Table 1.

TABLE 1

|  | CAC-1 | CAC-2 | CAC-3 | CAC-4 |
| --- | --- | --- | --- | --- |
| Average temperature (° C.) | 60-63 | 60 | 60 | 60-70 |
| Potential (V) | 7 | 1.5 | 8 | 2 |
| Current (A) | 0.466 | 2.88 | 0.383 | 3.66 |

After the second adhesive layer was cured on the second substrate, two wires of a direct current electricity generator were connected to the two ends of the substrate having the conductive adhesive layer. Voltages were applied on the conductive adhesive layer for 20 seconds and the temperature of the adhesive layer on lines 3, 14 and 25 was measured by a non-contact temperature gun. In addition, a spring balance was hooked into a reinforced hole on one side of the second substrate. The peeling force was determined by maximum value at the spring balance evenly pulling the substrate up vertically which would be evaluated as "Good". The test results are shown in Table 2.

TABLE 2

|  | Ex. 1 | Ex. 2 | Ex. 3 | Ex. 4 |
| --- | --- | --- | --- | --- |
| Average temperature (° C.) | 135 | 116 | 70 | 73 |
| Potential (V) | 15 | 11 | 7 | 7 |
| Current (A) | 1.68 | 1.02 | 0.614 | 0.616 |
| Force (g) | 50 | 150 | 50 | 70 |
| Debondability | Good | Good | Good | Good |

As can be seen from Tables, the composite bodies consisting of a polycarbonate substrate and a polyester substrate bonded by the two-layer adhesive system based on various types of thermoplastic or thermoset resins used in both adhesives could reach a high temperature between the interface of the two adhesive layers sufficient for loosen the bond when a low power resistive heating was applied to the conductive adhesive layer in 20 seconds. Attributed to this, the composite bodies in the examples could be easily peeled with a relatively lower force.

The invention claimed is:

1. A heat separable two-layer adhesive system, comprising;
   a layer of first adhesive; and
   a layer of second adhesive bonded to the layer of a first adhesive, wherein the layer of first adhesive comprises:
   a) conductive particles selected from the group consisting of silver, gold, palladium, platinum, carbon black, carbon fiber, graphite, indium tin oxide, silver-plated nickel, silver-plated copper, silver-plated graphite, silver-plated aluminum, silver-plated fiber, silver-plated glass, silver-plated polymer, antimony-doped tin oxide, and combinations thereof;
   b) diethylene glycol monobutyl ether; and
   c) a polyurethane resin,
   wherein the conductive particles, diethylene glycol monobutyl ether, and polyurethane resin are mixed together.

2. The heat separable two-layer adhesive system of claim 1, wherein the conductive particles have a surface area of from 0.01 $m^2/g$ to 10 $m^2/g$, measured by the BET method.

3. The heat separable two-layer adhesive system of claim 1, wherein the first adhesive composition further comprises a solvent.

4. The heat separable two-layer adhesive system of claim 3, wherein the solvent is selected from the group consisting of butyl glycol acetate, 1,4-butanediol diglycidyl ether, p-tert-butyl-phenyl glycidyl ether, allyl glycidyl ether, glycerol diglycidyl ether, butyldiglycol, 2-(2-butoxyethoxy)-ethylester, acetic acid, 2-butoxyethylester, butylglycol, 2-butoxyethanol, isophorone, 3,3,5 trimethyl-2-cyclohexene-1-one, dimethylsuccinate, dimethylglutarate, dimethyladipate, acetic acid, dipropylene glycol (mono)methyl ether, propylacetate, glycidyl ether of alkyl phenol, and dimethyl esters of adipic, glutaric, succinic acids, and combinations thereof.

5. The heat separable two-layer adhesive system of claim 1, wherein the first adhesive layer further comprises a resin binder selected from the group consisting of phenoxy resins, polyesters, phenolic resins, thermoplastic acrylic polymers, acrylic block copolymers, acrylic polymers having tertiary-alkyl amide functionality, polysiloxane polymers, polystyrene copolymers, polyvinyl polymers, divinylbenzene copolymers, polyetheramides, polyvinyl acetals, polyvinyl butyrals, polyvinyl acetols, polyvinyl alcohols, polyvinyl acetates, polyvinyl chlorides, methylene polyvinyl ethers, cellulose acetates, styrene acrylonitriles, amorphous polyolefins, polyacrylonitriles, ethylene vinyl acetate copolymers, ethylene vinyl acetate terpolymers, functional ethylene vinyl acetates, ethylene acrylate copolymers, ethylene acrylate terpolymers, ethylene butadiene copolymers and/or block copolymers, styrene butadiene block copolymers, vinyl resins, acrylic resins, phenolic resins, epoxy resins, maleimide resins, bismaleimide resins, polyimide resins, silicon-containing resins, and mixtures thereof.

6. The heat separable two-layer adhesive system of claim 1, further comprising a solvent and a thermoplastic resin binder or thermoset resin binder.

7. The heat separable two-layer adhesive system of claim 1, wherein the second adhesive is different than the first adhesive, and the second adhesive comprises a cured product of an adhesive composition comprising a resin binder.

8. The heat separable two-layer adhesive system of claim 1, wherein the conductive particles have a surface area of from 0.01 $m^2/g$ to 10 $m^2/g$, measured by BET method, and further comprises a thermoplastic resin binder or thermoset resin binder.

9. The heat separable two-layer adhesive system of claim 1, wherein the layer of second adhesive is configured to be separated from the layer of first adhesive after the layer of first adhesive is subjected to resistive heating.

10. The heat separable two-layer adhesive system of claim 9, wherein a voltage of 40 Watt or less is applied to the layer of first adhesive to provide the resistive heating.

11. A heat separable bonded composite body, comprising a first substrate, a second substrate, and the heat separable two-layer adhesive system of claim 1 between the first substrate to the second substrate.

12. The heat separable bonded composite body of claim 11, wherein the first and second substrates are made from non-conductive materials.

13. The heat separable bonded composite body of claim 12, wherein the non-conductive materials are each independently selected from the group consisting of wood, paper, cardboard, plastics, glass, concrete, ceramics, and stone.

14. A process for adhesive separation, the process comprising:
   providing the heat separable two-layer adhesive system of claim 1; and
   applying a voltage to the layer of first adhesive to resistively heat the layer of first adhesive to decrease the adhesion of the layer of first adhesive to the layer of second adhesive-so that the layer of second adhesive can be separated from the layer of first adhesive.

15. The process for adhesive separation of claim 14, wherein the layer of second adhesive comprises a thermoplastic resin, the layer of second adhesive has a boundary layer in contact with the layer of first adhesive, and the boundary layer is heated by the layer of first adhesive to a temperature above the softening point of the thermoplastic resin.

16. The process for adhesive separation of claim 14, wherein the layer of second adhesive comprises a thermoset resin, the layer of second adhesive has a boundary layer in contact with the layer of first adhesive, and the boundary layer is heated by the layer of first adhesive to a temperature that breaks the cross-linked thermoset structure of the thermoset resin.

17. The process for adhesive separation of claim 14, wherein the voltage applied to the layer of first adhesive is 40 Watt or less.

18. The heat separable two-layer adhesive system of claim 1, wherein the temperature for separation of the layer of first adhesive from the layer of second adhesive is less than 80° C.

19. A heat separable two-layer adhesive system, comprising:
- a layer of first adhesive; and
- a layer of second adhesive bonded to the layer of a first adhesive, wherein:
  the layer of first adhesive comprises:
  a) conductive particles selected from the group consisting of silver, gold, palladium, platinum, carbon black, carbon fiber, graphite, indium tin oxide, silver-plated nickel, silver-plated copper, silver-plated graphite, silver-plated aluminum, silver-plated fiber, silver-plated glass, silver-plated polymer, antimony-doped tin oxide, and a combination thereof;
  b) diethylene glycol monobutyl ether;
  c) dipropylene glycol methyl ether; and
  d) a polyurethane resin, the conductive particles, diethylene glycol monobutyl ether, dipropylene glycol methyl ether, and polyurethane resin are mixed together, and the layer of the second adhesive comprises a polyurethane adhesive.

* * * * *